(12) United States Patent
Han (10) Patent No.: US 10,195,840 B2
(45) Date of Patent: Feb. 5, 2019

(54) THREE-DIMENSIONAL PRINTER USING PHOTOCURABLE RESIN

(71) Applicant: Seoul National University of Technology Center for Industry Collaboration, Seoul (KR)

(72) Inventor: Sangjo Han, Seoul (KR)

(73) Assignee: Seoul National University of Technology Center for Industry Collaboration, Seoul (KR)

( * ) Notice: Subject to any disclaimer, the term of this patent is extended or adjusted under 35 U.S.C. 154(b) by 109 days.

(21) Appl. No.: 15/318,319

(22) PCT Filed: Feb. 24, 2015

(86) PCT No.: PCT/KR2015/001763
§ 371 (c)(1),
(2) Date: Dec. 12, 2016

(87) PCT Pub. No.: WO2015/190669
PCT Pub. Date: Dec. 17, 2015

(65) Prior Publication Data
US 2017/0113419 A1    Apr. 27, 2017

(30) Foreign Application Priority Data

Jun. 13, 2014    (KR) .................. 10-2014-0072308

(51) Int. Cl.
*B29C 67/00* (2017.01)
*B33Y 30/00* (2015.01)
(Continued)

(52) U.S. Cl.
CPC ............ *B33Y 30/00* (2014.12); *B29C 64/124* (2017.08); *B33Y 40/00* (2014.12); *B33Y 50/02* (2014.12);
(Continued)

(58) Field of Classification Search
CPC ... B29C 64/106; B29C 64/124; B29C 64/129; B29C 64/20; B29C 64/241;
(Continued)

(56) References Cited

U.S. PATENT DOCUMENTS

| 2008/0179787 A1* | 7/2008 | Sperry ................... B33Y 10/00 264/308 |
| 2011/0089610 A1* | 4/2011 | El-Siblani ............... B29C 33/44 264/401 |
| 2013/0052292 A1* | 2/2013 | Busato ................ B29C 67/0066 425/174.4 |

FOREIGN PATENT DOCUMENTS

| EP | 0379068 A2 | 7/1990 |
| KR | 10-2005-0108953 A | 11/2005 |

(Continued)

OTHER PUBLICATIONS

International Search Report dated Jun. 19, 2015 corresponding to International Application No. PCT/KR2015/001763.

*Primary Examiner* — Joseph S Del Sole
*Assistant Examiner* — Lawrence D. Hohenbrink, Jr.
(74) *Attorney, Agent, or Firm* — Hauptman Ham, LLP (57) ABSTRACT

The present disclosure relates to a three-dimension printing apparatus using photocurable resin, the three-dimension printing apparatus capable of easily separating the cured photocurable resin from a bottom surface of an accommodating unit where the photocurable resin is accommodated by moving the accommodating unit in a spiral direction, and including the accommodating unit configured to receive light being emitted from a light source, and to provide space for the photocurable resin accommodated therein to be cured by the light; a moving unit configured to move cured photocurable resin in a direction distancing away from the light source, so that the photocurable resin accommodated in the accommodating unit is cured sequentially by the light;

(Continued)

and a separation guiding unit mounted onto the accommodating unit, and configured to move at the same time as the accommodating unit along a spiral direction so that the cured photocurable resin is separated from an inner surface of the accommodating unit.

18 Claims, 8 Drawing Sheets

(51) Int. Cl.
*B33Y 40/00* (2015.01)
*B33Y 50/02* (2015.01)
*B33Y 70/00* (2015.01)
*B29C 64/124* (2017.01)
*B29C 64/106* (2017.01)
*B29C 64/241* (2017.01)
*B29C 64/379* (2017.01)
*B29C 64/245* (2017.01)
*B29C 64/277* (2017.01)
*B29C 64/286* (2017.01)
*B29C 64/264* (2017.01)
*B29C 64/129* (2017.01)
*B29C 64/393* (2017.01)

(52) U.S. Cl.
CPC ............ *B33Y 70/00* (2014.12); *B29C 64/106* (2017.08); *B29C 64/129* (2017.08); *B29C 64/241* (2017.08); *B29C 64/245* (2017.08); *B29C 64/264* (2017.08); *B29C 64/277* (2017.08); *B29C 64/286* (2017.08); *B29C 64/379* (2017.08); *B29C 64/393* (2017.08)

(58) Field of Classification Search
CPC ... B29C 64/245; B29C 64/264; B29C 64/277; B29C 64/286; B29C 64/379
USPC .............................................. 425/174.4, 375
See application file for complete search history.

(56) References Cited

FOREIGN PATENT DOCUMENTS

KR         10-0930788 B1     12/2009
KR    10-2012-0033352 A      4/2012

* cited by examiner

THREE-DIMENSIONAL PRINTER USING PHOTOCURABLE RESIN

CROSS REFERENCE TO RELATED APPLICATION

This application claims the benefit of Korean Application No. 10-2014-0072308 filed on Jun. 13, 2014 with the Korean Intellectual Property Office. Further, this application is the National Phase application of International Application No. PCT/KR2015/001763 filed Feb. 24, 2015, which designates the United States and was published in Korean.

BACKGROUND

Field

The present disclosure relates to a three-dimension printing apparatus using photocurable resin, and more particularly, to a three-dimension printing apparatus using photocurable resin, that is capable of easily separating the photocurable resin adhered, in a cured state, to a bottom surface of an accommodating unit where the photocurable resin is accommodated, from the bottom surface of the accommodating unit by moving the accommodating unit in a spiral direction.

Description of Related Art

Recently, active research is underway on not only two-dimension (2D) printers but also on three-dimension (3D) printers configured to print 3D objects.

Here, the three-dimension (3D) printers are equipment configured to pile up materials such as polymer(resin), metal and the like of the form of liquid or powder, according to design data, in a processing layer-by-layer method, to prepare a 3D object.

This originated from rapid prototyping (RP) which means a technique of rapidly molding a shape intended to be produced according to three-dimension CAD, utilizing laser and powder materials. It is a concept opposite to subtractive manufacturing that produces a three-dimension object in a method of cutting or carving a material of a three-dimension shape, using mechanical processing or laser.

Various three-dimension printers have been developed so far, including well-known methods such as the fused deposition modeling (FDM) method for melting a thermoplastic material of a filament form inside a nozzle to deposit the melted thermoplastic material while outputting the same in a thin film form, the multi jetting modeling (MJM) method for simultaneously spraying a photocurable resin and wax from a printer head and then depositing the sprayed photocurable resin and the wax while solidifying the same with ultraviolet ray, and the digital light processing (DLP) method and the like for projecting light of a shape to be molded, to a liquid state photocurable resin, using a digital light projector (DLP), and depositing the same.

Of these methods, the DLP method has advantages of low cost, uniform operating speed and relatively rapid molding speed. Despite these advantages, there occurs a problem where cured photocurable resin is adhered to an inner surface of the accommodating unit while curing the photocurable resin and the shape of the cured photocurable resin is damaged in the process of separating the cured photocurable resin.

Therefore, in the case of printing a three-dimension structure shape by the DLP method in particular, whether or not it is possible to efficiently separate the cured photocurable resin from the inner surface of the accommodating unit is one of the tasks to be solved, and thus a lot of researches are underway on ways to solve the aforementioned problem.

SUMMARY

Therefore, a purpose of the present disclosure is to solve the aforementioned problems of prior art, that is, to provide a three-dimension printing apparatus using photocurable resin, the three-dimension printing apparatus capable of efficiently separating the cured photocurable resin from the inner surface of the accommodating unit in which the photocurable resin is accommodated, by moving the accommodating unit along a spiral direction.

According to the present disclosure, the aforementioned purpose is achieved by a three-dimension printing apparatus using photocurable resin, the three-dimension printing apparatus including an accommodating unit configured to receive light being emitted from a light source and to provide space for the photocurable resin accommodated in the accommodating unit to be cured by the light; a moving unit configured to move cured photocurable resin in a direction away from the light source, so that the photocurable resin accommodated in the accommodating unit is cured sequentially by the light; and a separation guiding unit mounted onto the accommodating unit, and configured to move simultaneously together with the accommodating unit along a spiral direction so that the cured photocurable resin is separated from an inner surface of the accommodating unit.

Here, it is preferable that the separation guiding unit includes a body configured to cover an outer surface of the accommodating unit; a driving unit having a rotation axis whose outer surface has a protruding unit, the driving unit being connected to one end of the body to move the one end of the body in a gravitational direction by the rotation of the protruding unit; and a pair of sliding units mounted onto the other end of the body and configured such that one of the pair of sliding units is fixed while the other slides on the body during the operation of the driving unit.

Further, it is preferable that the sliding unit is rotatably mounted onto both side corners of the other end of the body.

Further, it is preferable that the three-dimension printing apparatus further includes a case configured to accommodate the light source, a light adjusting unit and the separation guiding unit inside thereof; and a rail unit connected to an inner surface of the case and connected to the sliding unit so that the sliding unit slides in a longitudinal direction.

Further, it is preferable that the separation guiding unit further includes a deviation preventing unit of which one end is rotatably mounted onto both side corners of the one end of the body and of which another end penetrates an outer surface of the case so as to prevent the body from deviating from a predetermined movement direction.

Further, it is preferable that the separation guiding unit further includes an elastic member mounted onto the deviation preventing unit, and configured to apply elastic force to the deviation preventing unit so as to return the separation guiding unit and the body to initial position.

Further, it is preferable that the three-dimension printing apparatus further includes a light sensor unit configured to obtain information by measuring the light being emitted from the light source; and a control unit configured to receive information of the light from the light sensor unit, and to control intensity of the light being emitted from the light source.

Further, it is preferable that the limiting unit is detachably connected to the body and wherein a time point when the limiting unit deviates from the body is a time point when the accommodating unit and the moving unit contact each other.

According to the present disclosure, a three-dimension printing apparatus using photocurable resin is provided, the three-dimension printing apparatus capable of effectively separating the cured photocurable resin from the inner surface of the accommodating unit while maintaining the shape of the cured photocurable resin.

Further, it is possible to efficiently cure the photocurable resin by measuring the intensity of light being emitted from the light source and adjusting the intensity of light being emitted from the light source based on the measurement.

Further, it is possible to precisely return the accommodating unit to its initial position for curing the photocurable resin even when repeatedly moving the accommodating unit.

Further, it is preferable that the three-dimension printing apparatus further includes a limiting unit connected between the case and the body and configured to limit a movement path of the body which moves in a direction approaching the case so as to limit movement of the accommodating unit.

DETAILED DESCRIPTION

Hereinafter, a three-dimension printing apparatus using photocurable resin according to an embodiment of the present disclosure will be explained in detail with reference to the drawings attached.

Figure 1:
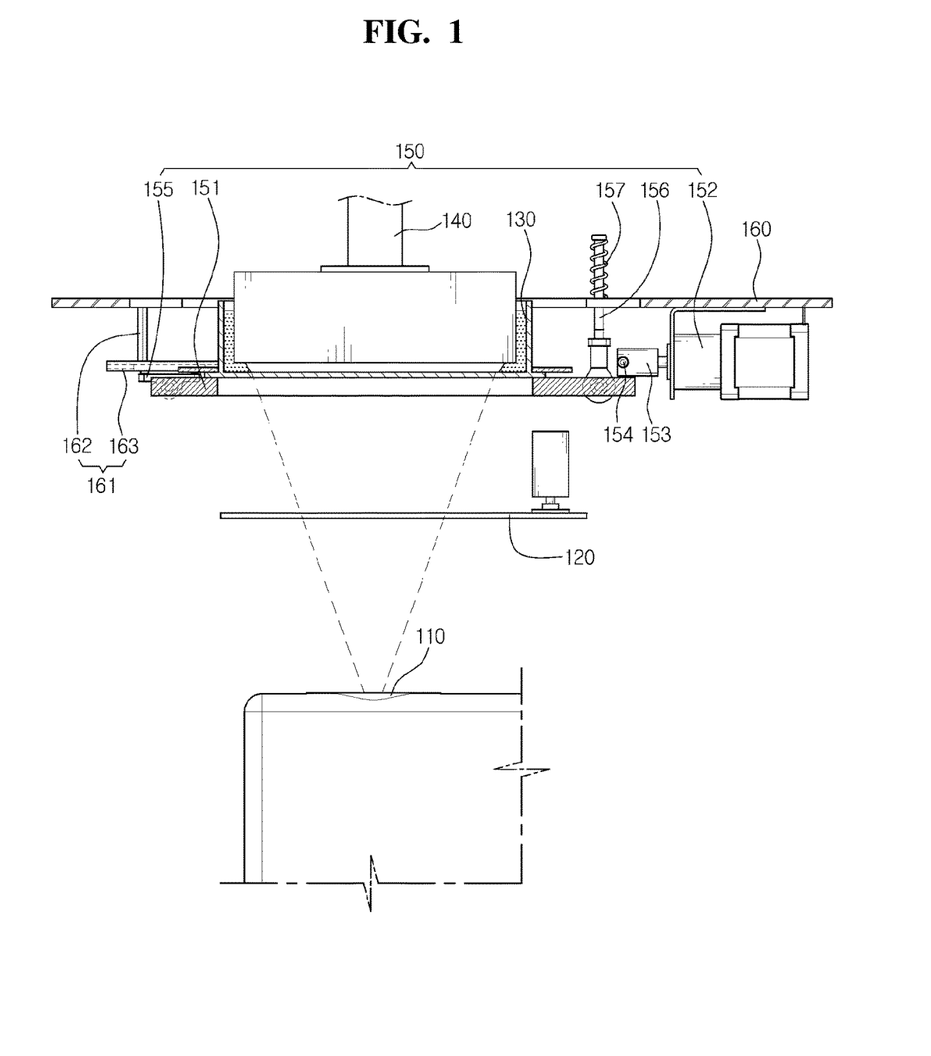
FIG. 1 is a view schematically illustrating a three-dimension printing apparatus using photocurable resin, according to an embodiment of the present disclosure.

FIG. 1 is a view schematically illustrating a three-dimension printing apparatus using photocurable resin, according to an embodiment of the present disclosure.

Referring to FIG. 1, the three-dimension printing apparatus 100 using photocurable resin according to an embodiment of the present disclosure is capable of effectively separating cured photocurable resin from an inner surface of an accommodating unit without deforming the shape of the cured photocurable resin, and the apparatus includes a light source 110, a light adjusting unit 120, the accommodating unit 130, a moving unit 140, a separation guiding unit 150, a case 160, a light sensor unit (not illustrated) and a control unit (not illustrated).

The light source 110 emits light for curing the photocurable resin.

In an embodiment of the present disclosure, the light being emitted from the light source 110 may be light of ultraviolet (UV) rays. In general, ultraviolet rays have shorter wavelengths than other visible rays, and thus it is possible to use microscopic pixels by being equipped with a phase modulation light exposure head that has ultraviolet rays as the light source.

However, there is no limitation thereto, and thus it is possible to use any light such as electron beams (EB) and visible rays as long as it can print a three-dimension structure by curing a photocurable resin.

The light adjusting unit 120 is provided between the light source 110 and the accommodating unit 130 that will be explained later on. The light adjusting unit 120 adjusts a radiation area of light which is emitted from the light source 110 and which approaches the accommodating unit 130.

That is, the light adjusting unit 120 is installed on a light path of the light being emitted from the light source 110, and adjusts the radiation area of light which approaches the accommodating unit 130.

Meanwhile, in an embodiment of the present disclosure, the light adjusting unit 120 may be a shutter configured to enter or deviate from the light path of the light so as to determine the progression of the light being emitted from the light source 110.

That is, during the separating process of separating the cured photocurable resin from the inner surface of the accommodating unit 130, the light adjusting unit 120 may completely enter the light path of the light and completely interrupt the progression of the light, and in order to adjust the region to be cured according to the shape being printed, the light adjusting unit 120 may adjust the radiation area of the light by completely deviating from the light path or partially entering the light path.

Of course, in an embodiment of the present disclosure, the light adjusting unit 120 is not limited to the aforementioned, and thus, any means for adjusting the radiation area of light may well be applied.

The accommodating unit 130 accommodates the photocurable resin inside thereof, and provides space where the photocurable resin may be cured.

Meanwhile, since it was explained that in an embodiment of the present disclosure the light source 110 emits light of an ultraviolet ray region, in an embodiment of the present disclosure, it is preferable that the photocurable resin being accommodated inside the accommodating unit 130 is an ultraviolet ray curable resin that may be cured in response to light of an ultraviolet ray region.

Of course, in case that the light source 110 emits E-beam unlike in an embodiment of the present disclosure, the photocurable resin being accommodated in the accommodating unit 130 may be an E-beam curable resin, and further, in case that the light source 110 emits light of a visible ray region, a curable resin that may be cured by light of the visible ray region may be used.

In other words, the light to be emitted from the light source 110 and the photocurable resin to be accommodated in the accommodating unit 130 are provided to correspond to each other.

In the present disclosure, three-dimension printing cures the photocurable resin correspondingly to a two-dimension plane to which the light is being radiated, but the process is sequentially repeated, thereby eventually printing a three-dimension structure intended by the user, and thus the accommodating unit 130 may be positioned such that its lower surface faces the light source 110 in order to cure the photocurable resin inside the accommodating unit 130 in a two-dimension plane.

Meanwhile, in an embodiment of the present disclosure, the region where curing of the photocurable resin occurs may be a region close to the light source 110, that is, a region close to a lower surface of the accommodating unit 130, and more preferably, a lowermost surface of the accommodating unit 130.

Figure 2:
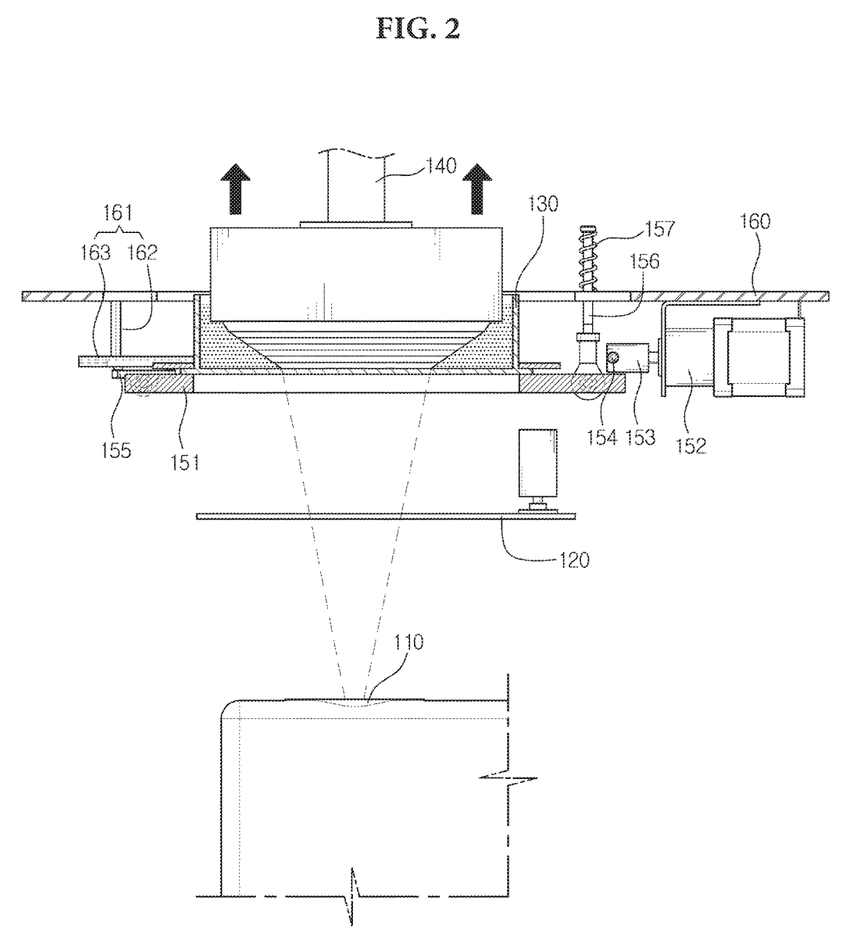
FIG. 2 is a view schematically illustrating a moving unit of the three-dimension printing apparatus using photocurable resin, according to FIG. 1.

FIG. 2 is a view schematically illustrating a moving unit of the three-dimension printing apparatus using photocurable resin, according to FIG. 1.

Referring to FIG. 2, the moving unit 140 is configured to sequentially cure the photocurable resin in three-dimension, and is thus provided to be movable in a three-dimension height direction.

That is, when the curing of the photocurable resin is completed by the light emitted from the light source 110, the moving unit 140 moves the cured photocurable resin such that the cured photocurable resin distances away from the light source 110 in a gravitational direction, more preferably, in the height direction of the three-dimension structure that the user intends to print. Accordingly, inside the accommodating unit, uncured photocurable resins are introduced into the region where curing of the photocurable resin occurs, and subsequently, light of which the radiation area has been adjusted by the light adjusting unit 120 is radiated, thereby curing the photocurable resin sequentially correspondingly to the shape of the three-dimension structure.

Meanwhile, according to an embodiment of the present disclosure, the photocurable resin is cured and simultaneously adhered to the lower surface facing the light source 110 and the moving unit 140 is provided to move the cured photocurable resin.

That is, at least the lower surface of the moving unit 140 is positioned inside the accommodating unit 130, and the curing of the photocurable resin occurs in a region between the lower surface of the moving unit 140 and the inner lower surface of the accommodating unit 130.

Here, it is preferable that a distanced gap between the lower surface of the moving unit 140 and the inner lower surface of the accommodating unit 130 is distanced by a gap to the extent that enables the photocurable resin to be adhered to the lower surface of the moving unit 140 at the same time as it is cured, based on the intensity of light being radiated from the light source 110.

Further, it is preferable that the lower surface of the moving unit 140 is made of a material having a more excellent adhesive force with the photocurable resin than the inner lower surface of the accommodating unit 130. This will be explained later on.

Figure 3:
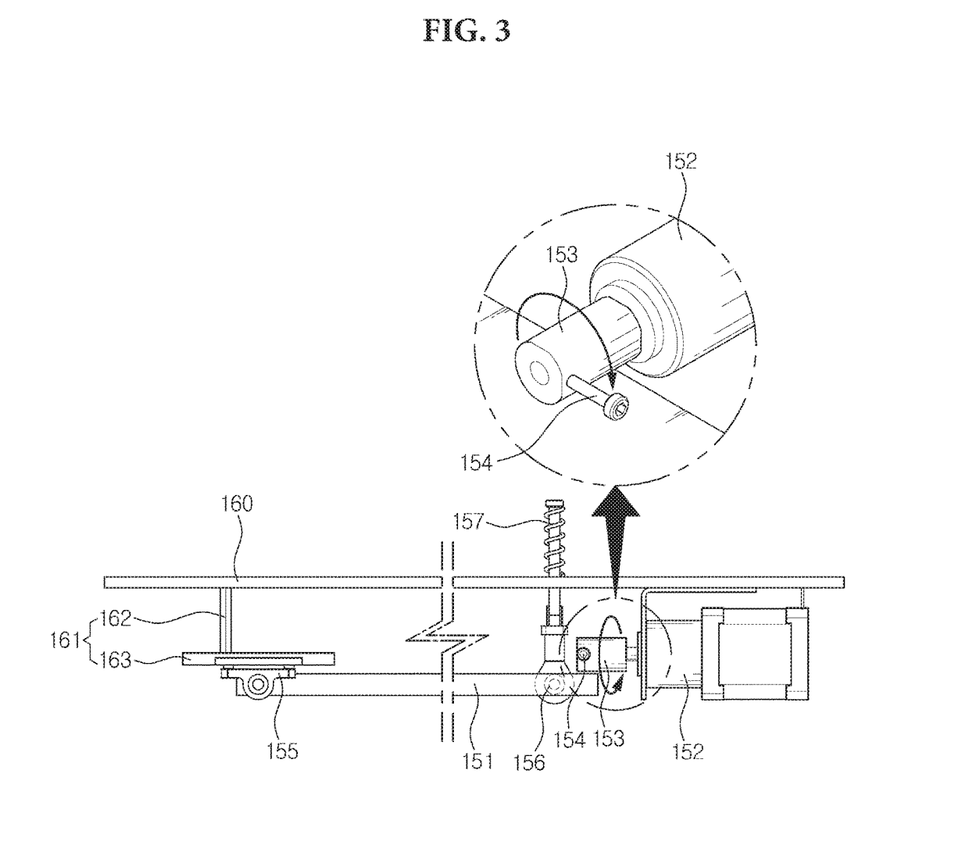
FIG. 3 is a view schematically illustrating a separation guiding unit of the three-dimension printing apparatus using photocurable resin, according to FIG. 1.

FIG. 3 is a view schematically illustrating a separation guiding unit of the three-dimension printing apparatus using photocurable resin, according to FIG. 1.

Referring to FIG. 3, in case that the moving unit 140 moves the cured photocurable resin, the separation guiding unit 150 is configured to move the accommodating unit 130 along a spiral direction so as to enable easy separation of the cured photocurable resin from the inner surface of the accommodating unit 130. In an embodiment of the present disclosure, the separation guiding unit 150 includes a body 151, a driving unit 152, a sliding unit 155, a deviation preventing unit 156 and an elastic member 157.

The body 151 is configured to play a role of a main frame of the separation guiding unit 150, and is disposed to cover an outer surface of the accommodating unit 130. More preferably, the body 151 is provided correspondingly to the shape of the outer surface of the accommodating unit 130, thereby enabling the body 151 and the accommodating unit 130 to move integrally.

In an embodiment of the present disclosure, the body 151 is provided as a member having a flat plate form, and includes an insertion unit 151a into which the accommodating unit 130 may be inserted, but there is no limitation thereto. Further, for convenience of explanation, explanation is made based on an assumption that the body 151 is disposed parallel to the ground when where neither a tilt nor a twist rotation occurred in the body 151.

Figure 4:
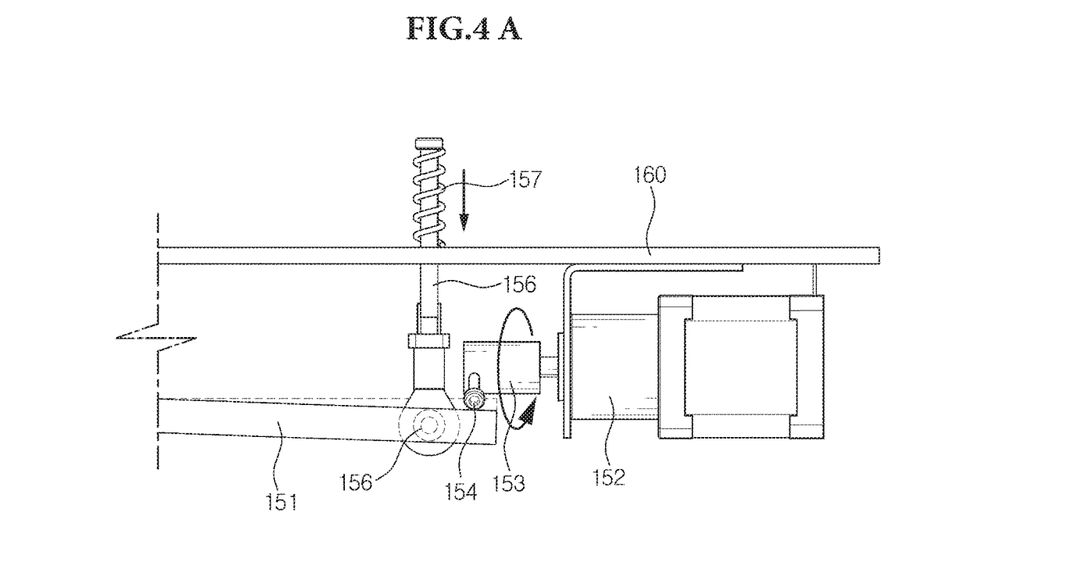
FIGS. 4A and 4B are a view schematically illustrating how a tilt occurs in a body of the three-dimension printing apparatus using photocurable resin, according to FIG. 1.

FIGS. 4A and 4B are a view schematically illustrating how a tilt occurs in the body of the three-dimension printing apparatus using photocurable resin according to FIG. 1.

Referring to FIGS. 4A and 4B, the driving unit 152 is connected to one end of the body 151 and is configured to guide such that a tilt occurs at the one end of the body 151. The driving unit 152 includes a rotation axis 153 and a protruding unit 154 protruding from the rotation axis 153 in a radial direction.

That is, in a normal state, the rotation axis 153 of the driving unit 152 maintains a state of contact with the one end of the body 151, and when the rotation axis 153 of the driving unit 152 rotates and thus the protruding unit 154 contacts the one end of the body 151, the one end of the body 151 tilts in a downward direction, which is defined a tilt.

Here, the extent of tilt of the one end of the body 151 varies depending on the state of contact between the protruding unit 154 and the one end of the body 151, and when the protruding unit 154 is disposed perpendicularly to the one end of the body 151, the tilt of the one end of the body 151 becomes maximum.

Accordingly, a tilt occurs in the accommodating unit 130 as well together with the body 151.

Further, the rotation direction of the rotation axis 153 of the driving unit 152 may be adjusted appropriately, and it is possible to change the rotation direction of the body 151 by appropriately adjusting the rotation direction of the rotation axis 153 and a fixed sliding unit of the pair of sliding units 155 to be explained later.

Figure 5A:
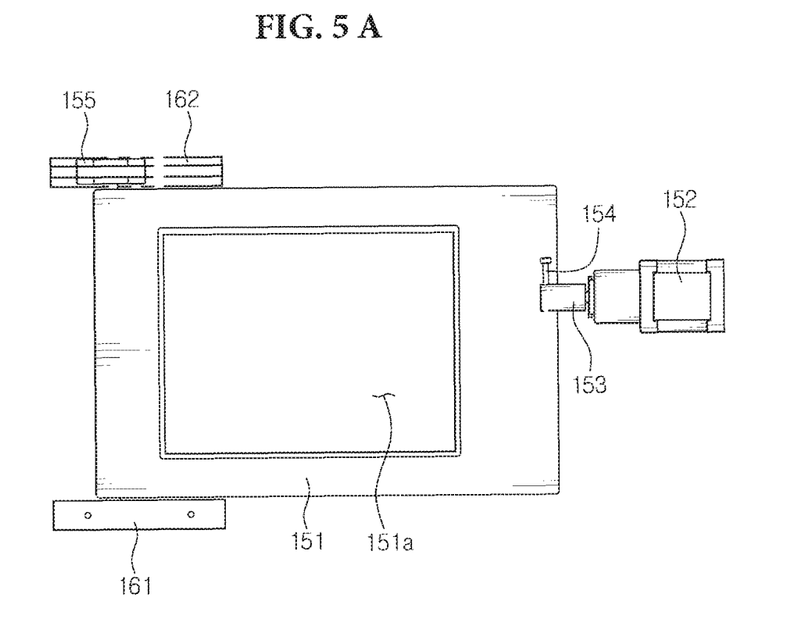
FIGS. 5A and 5B are a view schematically illustrating how a twist rotation of the body occurs in the three-dimension printing apparatus using photocurable resin, according to FIG. 1.
Figure 5B:
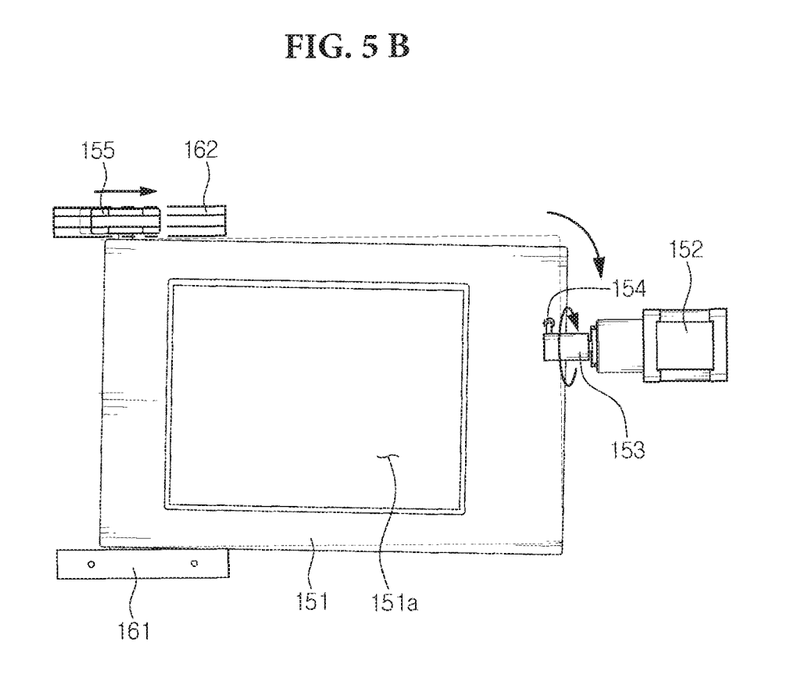

FIGS. 5A and 5B are a view schematically illustrating how a twist rotation occurs in the body of the three-dimension printing apparatus using photocurable resin according to FIG. 1.

Referring to FIGS. 5A and 5B, the pair of sliding units 155 is mounted onto the other end of the body 151, and when the driving unit 152 is actuated, and more particularly, when the protruding unit 154 contacts the one end of the body 151, any one of the pair of sliding units 155 is fixed while the other one slides in a direction from the the other end of the body 151 towards the one end of the body 151, thereby generating a twist rotation of the body 151.

In an embodiment of the present disclosure, the sliding unit 155 is rotatably mounted onto both side corners of the other end of the body 151, which is for the purpose of sliding one of the sliding units 155 by the tilt occurring at the one end of the body 151.

That is, when the sliding unit 155 is rotatably installed at the both side corners of the another end of the body 151, negative effects on the tilt of the one end of the body 151 can be excluded.

Further, by fixing one of the one pair of the sliding units 155 while sliding the other of the pair of the sliding units 155, it is possible to pivot the body 151 about the fixed sliding unit 155. Here, the pivoting direction of the body 151 is determined depending on which sliding unit of the pair of the sliding units 155 is fixed, and its direction may be determined based on the user's intentions.

Figure 6A:
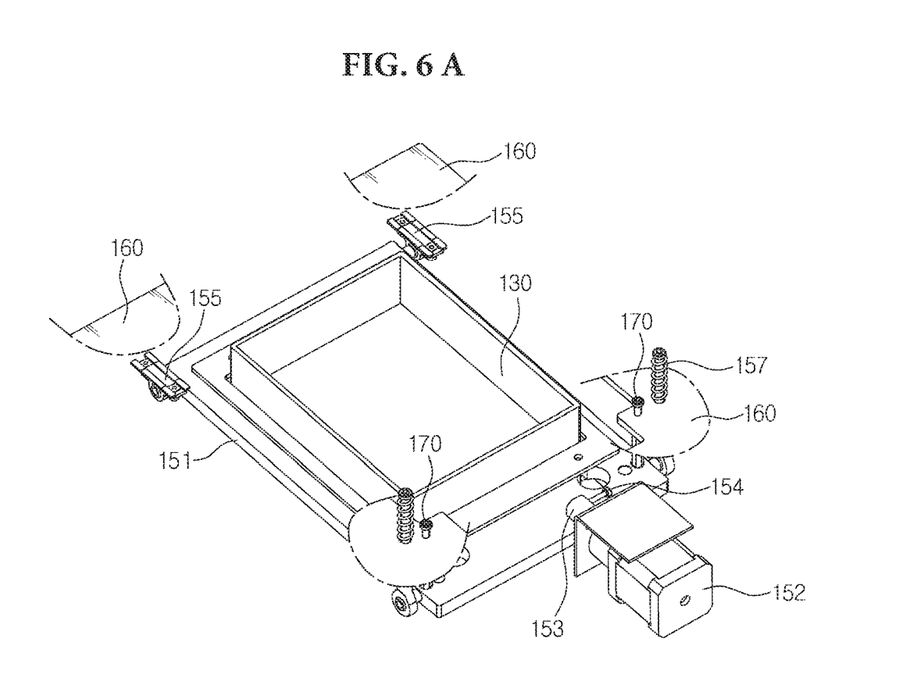
FIGS. 6A and 6B are a view schematically illustrating how a tilt and a twist rotation occur at the same time in the body of the three-dimension printing apparatus using photocurable resin, according to FIG. 1.
Figure 6B:
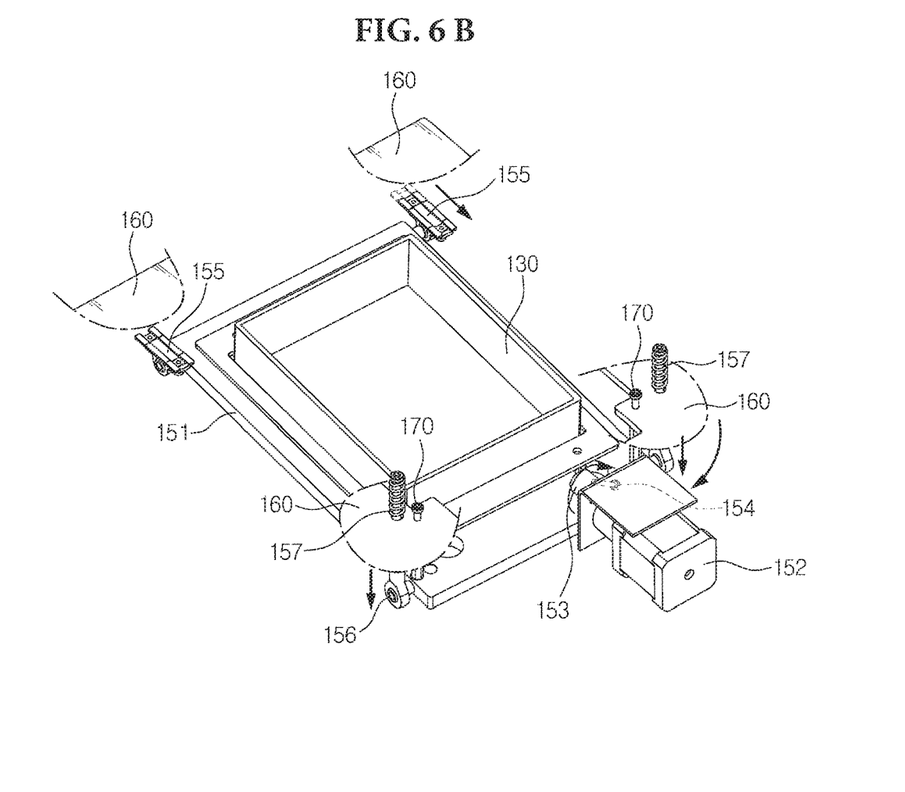

FIGS. 6A and 6B are a view schematically illustrating how a tilt and a twist rotation occur at the same time for the body of the three-dimension printing apparatus using photocurable resin according to FIG. 1.

Referring to FIGS. 6A and 6B, to explain the process of cooperation of the driving unit 152 and the sliding unit 155 once again, in case that a tilt occurs at the one end of the body 151 by the protruding unit 154 of the driving unit 152, a twist rotation occurs at the other end of the body 151 about the fixed sliding unit 155.

That is, a tilt and a twist rotation of the body 151 occurring at the same time makes the body 151 move in a spiral direction, and the accommodating unit 130 configured to move at the same time as the body 151 also moves in the spiral direction.

As aforementioned, the reason for allowing the accommodating unit 130 to move along the spiral direction is to effectively separate cured photocurable resin from the inner lower surface of the accommodating unit 130. That is, simultaneous application of shear stress and normal force to the photocurable resin adhered to the inner lower surface of the accommodating unit 130 separates the photocurable resin. In case of separating the cured photocurable resin by merely moving the cured photocurable resin by means of the moving unit 140 or by merely distancing the accommodating unit 130 from the moving unit 140, it is highly likely that the shape of the cured photocurable resin will be damaged, and thus in an embodiment of the present disclosure, a twist rotation and a tilt are applied at the same time to the accommodating unit to prevent such a damage to the shape.

Here, it is preferable that at least a portion of the sliding unit 155 that contacts the both side corners of the other end of the body 151 is made of a material having elastic force so that it may withstand the load being applied to the connecting portion of the sliding unit 155 and the body 151 when a twist rotation of the body 151 occurs.

Further, the extent of twist rotation of the body 151 may be provided to be smaller than the tilt of the body 151, thereby minimizing the load applied to the connecting portion of the sliding unit 155 and the body 151.

The deviation preventing unit 156 is configured such that one end thereof is rotatably mounted onto the one end of the body 151 and the other end thereof penetrates an outer surface of the case 160 that will be explained later on, thereby preventing the movement of the one end of the body 151 caused by the driving unit 152 from deviating from a predetermined movement direction.

That is, the deviation preventing unit 156 limits the movement range of the body 151, and maintains a state where the body 151 can repeat the movement within the limited movement range.

For this purpose, the deviation preventing unit 156 may further include an elastic member 157 disposed between the deviation preventing unit 156 and the case 160, or disposed to be penetrated by the deviation preventing unit 156 and to be is supported by the case 160.

That is, when the rotation axis 153 of the driving unit 152 rotates further from a state where the protruding unit 154 of the driving unit 152 is disposed perpendicularly to the one end of the body 151, the elastic member 157 applies elastic force to the body 151, thereby maintaining the state of contact of the body 151 and the rotation axis 153.

In other words, the tilt of the body 151 is caused by the driving unit 152, but is recovered by the elastic member 157.

Meanwhile, the deviation preventing unit 156 does not move along the gravitational direction, but partially slantedly in a direction in which the twist rotation occurs. Of course, since the displacement of the twist rotation occurs minutely, the deviation preventing unit 156 can be seen as moving substantially along the gravitational direction.

The case 160 is configured to accommodate the light source 110, the light adjusting unit 120 and the separation guiding unit 150 inside the case.

That is, in an embodiment of the present disclosure, by enabling at least the process of curing the photocurable resin to be performed inside the case 160, it is possible to exclude factors that may have negative effects on the process of curing the photocurable resin from interrupting the process unintentionally.

Meanwhile, the case 160 may further include a rail unit 161 connected to the sliding unit 155 of the separation guiding unit 150 so that the sliding unit 155 may slide.

The rail unit 161 is a member extending from the inner surface of the case 160, but also extending to the sliding unit 155 such that the sliding unit 155 may slide along the longitudinal direction. The rail unit 161 includes a connecting unit 162 and a rail 163.

The connecting unit 162 is a member extending from the inner surface of the case 160 to fix the position of the rail 163.

The rail 163 is a member that extends in a direction from one end to the other end of the body 151, or from the other end to the one end of the body 151 (hereinafter, 'longitudinal direction'), and the sliding unit 155 is slidably mounted thereon.

Meanwhile, the rail unit 161 is provided in one pair correspondingly to the pair of the sliding units 155.

Referring to FIG. 6, the limiting unit 170 is a member connected between the body 151 and the case 160, and particularly such that the one end connected to the case 160 is provided to be attachable/detachable to/from the case 160, thereby limiting the movement path of the body 151 which moves in a direction approaching the case 160.

In an embodiment of the present disclosure, one pair of the limiting unit 170 is provided between the one pair of the deviation preventing unit 156. One end of the limiting unit 170 penetrates the case 160 and the movement path of the limiting unit 170 is limited by a portion at the one end and a middle end thereof having a reduced diameter. This also limits the movement path of the body 151 connected to be attachable/detachable to/from the other end of the limiting unit 170, and particularly, limits the extent to which the body 151 approaches the case 160, that is, the upward movement path of the body 151.

Further, in an embodiment of the present disclosure, the limiting unit 170 may be provided such that a current occurs between the limiting unit 170 and the body 151. This may be used to determine an initial patterning position by measuring the state of contact between the accommodating unit 130 and the moving unit 140.

More specifically, in case that the accommodating unit 130 and the moving unit 140 contact each other due to the movement of the moving unit 140, thereby generating only a tilt of the body 151, the limiting unit 170 is deviated from the body 151, releasing the state of contact of the limiting unit 170 and the body 151.

Here, when the inner lower surface of the accommodating unit 130 and the lower surface of the moving unit 140 contact each other due to the movement of the moving unit 140, force is applied to the accommodating unit 130 in the gravitational direction, and thus only a tilt of the body 151 occurs.

That is, when flow of current between the body 151 and the limiting unit 170 is interrupted in the process where the moving unit 140 is performing a movement of approaching the accommodating unit 130, it is a case where only a tilt 151 of the body 151 occurred, which corresponds to a case where the inner lower surface of the accommodating unit 130 and the lower surface of the moving unit 140 contact each other.

Therefore, it is possible to determine the time point when the flow of current between the body 151 and the limiting unit 170 is interrupted as the initial patterning time point, and from that time point, raise the moving unit 140 by a certain height, thereby spacing the inner lower surface of the accommodating unit 130 apart from the lower surface of the moving unit 140 by a predetermined gap.

In an embodiment of the present disclosure, the inner surface of the accommodating unit 130 and the lower surface of the moving unit 140 are distanced by approximately 25 to 50 µm, and if the moving unit 140 is moved upwardly by approximately 50 µm at a time, at the time point when light is radiated towards the accommodating unit 130, the inner lower surface of the accommodating unit 130 and the lower surface of the cured curable photocurable resin maintain a state of distance spaced by substantially a same gap.

Of course, there is no limitation to the distanced gap between the inner lower surface of the accommodating unit 130 and the lower surface of the moving unit 140, and thus the distance gap may be changed if necessary.

The light sensor unit (not illustrated) is configured to measure the light being emitted from the light source 110. In an embodiment of the present disclosure, the light sensor unit (not illustrated) obtains information from light by converting the intensity of light into voltage.

Figure 7:
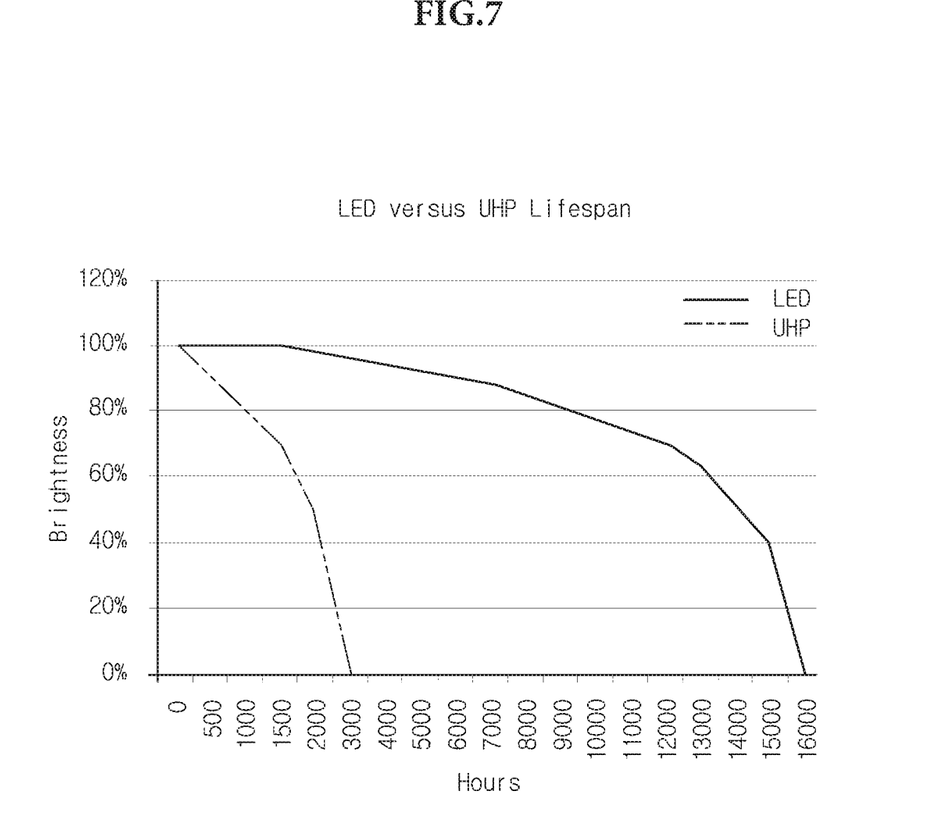
FIG. 7 is a graph schematically illustrating the amount of change of light being emitted from the light source in the three-dimension printing apparatus using photocurable resin, according to FIG. 1.

FIG. 7 is a graph schematically illustrating the amount of change of light being emitted from the light source in the three-dimension printing apparatus using photocurable resin according to FIG. 1.

Referring to FIG. 7, since the amount of light being emitted from the light source 110 changes over time, it is possible to measure the amount of light being emitted, in real time or at certain intervals, and to enable a uniform intensity of light to be emitted from the light source 110.

The control unit (not illustrated) is configured to receive input of the information of light from the aforementioned light sensor unit (not illustrated) and to adjust the intensity of the light being emitted from the light source 110. The reason for adjusting the intensity of the light being emitted from the light source 110 is substantially the same as that explained hereinabove with reference to the light sensor unit (not illustrated), and thus detailed explanation is omitted herein.

Hereinafter, an operation of an embodiment of the aforementioned three-dimension printing apparatus using photocurable resin will be explained.

Figure 8:
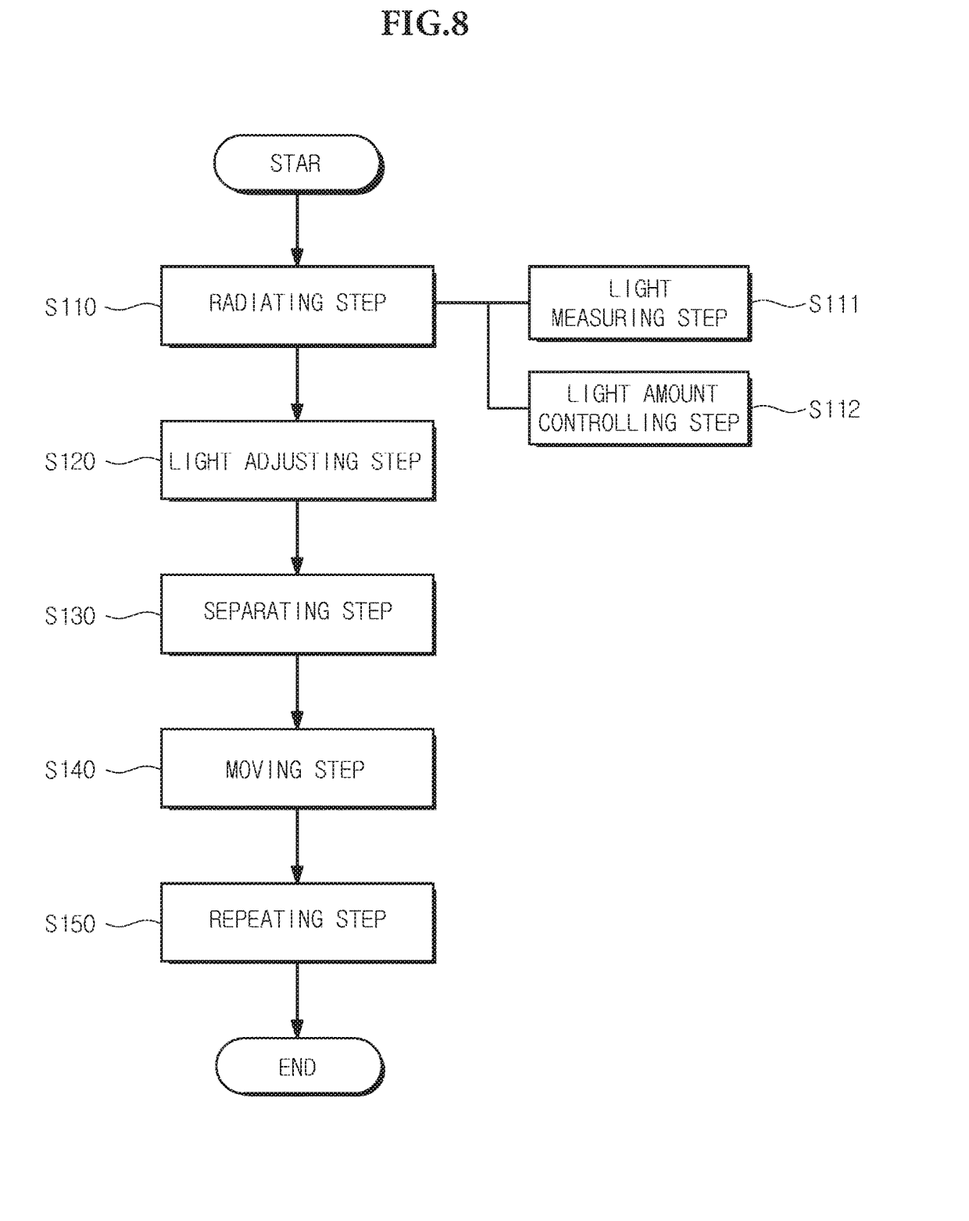
FIG. 8 is a flowchart of an operating method of the three-dimension printing apparatus using photocurable resin, according to an embodiment of the present disclosure.

FIG. 8 is a flowchart of an operating method of the three-dimension printing apparatus using photocurable resin, according to an embodiment of the present disclosure.

Referring to FIG. 8, an operating method of the three-dimension printing apparatus using photocurable resin according to an embodiment of the present disclosure includes a radiating step (S110), a light adjusting step (S120), a separating step (S130), a moving step (S140), and a repeating step (S150).

The radiating step (S110) is a step of radiating the light emitted from the light source 110 to an outer lower surface of the accommodating unit 130.

Here, selecting the light to be emitted from the light source 110 according to the properties of the photocurable resin is as mentioned above.

Meanwhile, according to an embodiment of the present disclosure, the radiating step (S110) may further include a light measuring step (S111) and a light amount controlling step (S112).

That is, although it is preferable to maintain a uniform intensity of light being radiated from the light source 110 to the accommodating unit 130, the light being emitted from the light source 10 changes over time. Accordingly, in the light measuring step (S111), the amount of change of light is measured by measuring the intensity of light being emitted from the light source 110 in real time or at a certain time interval, and in the light amount controlling step (S112), the amount of light being emitted from the light source 110 is adjusted by the control unit (not illustrated) based on the measured amount of change of light, thereby enabling the light being radiated to the accommodating unit 130 to maintain a certain intensity.

The light adjusting step (S120) is a step of adjusting the radiation area of light being emitted from the light source 110 by the light adjusting unit 120. In an embodiment of the present disclosure, the light adjusting unit 120 is disposed on the light path such that progression of light towards the accommodating unit 130 may be interrupted, but there is no limitation thereto.

The separating step (S130) is a step of separating the photocurable resin adhered, in a cured state, to the inner bottom surface of the accommodating unit 130 by moving the accommodating unit 130 along a spiral direction by the separation guiding unit 150, more precisely, by a tilt and a twist rotation of the body 151, in a state the position of the moving unit 140 is fixed.

In a conventional technique, it was general to separate cured photocurable resin from the inner bottom surface of the accommodating unit 130 by simply moving the accommodating unit 130 or the moving unit 140 thereby applying normal force or shear stress, and by such a method, lot of problems occurred where three-dimension shapes of cured photocurable resin were damaged.

Thus, in an embodiment of the present disclosure, the separation guiding unit 150 enables the accommodating unit 130 which moves simultaneously together with the separation guiding unit 150 to move in a spiral direction, in particular by a tilt, meaning slanting of one end of the body, and a twist rotation about a fixed sliding unit of the pair of the sliding units mounted onto the other end of the body.

That is, by simultaneously applying shear stress and normal force to the portion of contact between the accommodating unit 130 and the cured photocurable resin, it is possible to separate the cured photocurable resin from the inner bottom surface of the accommodating unit 130 without damage to the three-dimension structure, more effectively than prior art.

The moving step (S140) is a step of upwardly moving, by the moving unit 140, the photocurable resin separated from the inner bottom surface of the accommodating unit 130 at the step of separating (S130).

In an embodiment of the present disclosure, three-dimension printing is performed through a phased curing in the accommodating unit 130, and thus the moving step (S140) enables the photocurable resin cured in the accommodating unit 130 to move away from the region where curing occurs and enables liquid state photocurable resin to be introduced into the region where curing occurs.

Here, the gap at which the moving unit 140 moves the cured photocurable resin is provided in such a manner that the moving unit moves such that the bottom surface of the cured photocurable resin deviates from the region where the curing occurs, more preferably, such that the moving unit moves until the bottom surface of the cured photocurable resin contacts a boundary surface of the region where the curing occurs.

The repeating step (S150) is a step of repeating the aforementioned steps from the radiating step (S110) to the moving step (S140) until a printing of three-dimension structure is completed.

That is, in a state where the moving step (S140) is completed, light is radiated to the accommodating unit 130 once again to cure the photocurable resin, the photocurable resin adhered, in a cured state, to the inner bottom surface of the accommodating unit 130 is separated, and moving the twice-cured photocurable resin twice is performed by the moving unit 140, and then the aforementioned steps are repeated again.

Consequently, at the time point when the step of repeating (S150) is completed, the printing of three-dimension structure is completed.

In the drawings and specification, there have been disclosed typical embodiments of the invention, and although specific terms are employed, they are used in a generic and descriptive sense only and not for purposes of limitation. It will be understood by those of ordinary skill in the art that various changes in form and details may be made therein without departing from the spirit and scope of the present invention as defined by the following claims.

What is claimed is:

1. A three-dimension printing apparatus using photocurable resin, the apparatus comprising:
    an accommodator configured to receive light being emitted from a light source, and to provide space for the photocurable resin accommodated in the accommodator to be cured by the light;
    a mover configured to move cured photocurable resin in a direction away from the light source, so that the photocurable resin accommodated in the accommodator is cured sequentially by the light; and
    a separation guider mounted onto the accommodator, and configured to move accommodator along a spiral direction by applying a tilt to the accommodator simultaneously together with a twist rotation when viewed from a top, so that the cured photocurable resin is separated from an inner surface of the accommodator.

2. The three-dimension printing apparatus according to claim 1, wherein the separation guider comprises:
    a body configured to cover an outer surface of the accommodator;
    a driver having a rotation axis whose outer surface has protruder, the unit driver being connected to one end of the body to move the one end of the body in a gravitational direction by the rotation of the protruder; and
    a pair of sliders mounted onto another end of the body and configured such that one slider of the pair of sliders is fixed while the other slider of the pair of sliders slides on the body during the operation of the driver.

3. The three-dimension printing apparatus according to claim 2, wherein the slider is rotatably mounted onto both side corners of said another end of the body.

4. The three-dimension printing apparatus according to claim 3, further comprising:
    a case configured to accommodate the light source, a light adjustor and the separation guider inside the case; and
    a rail connected to an inner surface of the case and connected to the slider so that the slider slides in a longitudinal direction.

5. The three-dimension printing apparatus according to claim 4, wherein the separation guider further comprises:
    a deviation preventer having
        one end which is rotatably mounted onto both side corners of the one end of the body, and
        another end which penetrates an outer surface of the case so as to prevent the body from deviating from a predetermined movement direction.

6. The three-dimension printing apparatus according to claim 5, wherein the separation guider further comprises:
    an elastic member mounted onto the deviation preventer, and configured to apply elastic force to the deviation preventer so as to return the separation guider and the body to an initial position.

7. The three-dimension printing apparatus according to claim 4, further comprising:
    a limiter connected between the case and the body and configured to limit a movement path of the body which moves in a direction approaching the case so as to limit movement of the accommodator.

8. The three-dimension printing apparatus according to claim 7, wherein
    the limiter is detachably connected to the body, and
    a time point when the limiter deviates from the body is a time point when the accommodator and the mover contact each other.

9. The three-dimension printing apparatus according to claim 1, further comprising;
    a light sensor configured to obtain information by measuring the light being emitted from the light source; and
    a controller configured to receive information of the light from the light sensor and to control intensity of the light being emitted from the light source.

10. The three-dimension printing apparatus according to claim 2, further comprising;
    a light sensor configured to obtain information by measuring the light being emitted from the light source; and
    a controller configured to receive information of the light from the light sensor and to control intensity of the light being emitted from the light source.

11. The three-dimension printing apparatus according to claim 3, further comprising;
    a light sensor configured to obtain information by measuring the light being emitted from the light source; and
    a controller configured to receive information of the light from the light sensor and to control intensity of the light being emitted from the light source.

12. The three-dimension printing apparatus according to claim 4, further comprising;
    a light sensor configured to obtain information by measuring the light being emitted from the light source; and
    a controller configured to receive information of the light from the light sensor and to control intensity of the light being emitted from the light source.

13. The three-dimension printing apparatus according to claim 5, further comprising:
    a light sensor configured to obtain information by measuring the light being emitted from the light source; and a controller configured to receive information of the light from the light sensor and to control intensity of the light being emitted from the light source.

14. The three-dimension printing apparatus according to claim 6, further comprising;
   a light sensor configured to obtain information by measuring the light being emitted from the light source; and
   a controller configured to receive information of the light from the light sensor and to control intensity of the light being emitted from the light source.

15. The three-dimension printing apparatus according to claim 7, further comprising;
   a light sensor configured to obtain information by measuring the light being emitted from the light source; and
   a controller configured to receive information of the light from the light sensor and to control intensity of the light being emitted from the light source.

16. The three-dimension printing apparatus according to claim 8, further comprising;
   a light sensor configured to obtain information by measuring the light being emitted from the light source; and
   a controller configured to receive information of the light from the light sensor and to control intensity of the light being emitted from the light source.

17. The three-dimension printing apparatus according to claim 1, wherein
   said tilt is a translational movement in a downward direction, and
   said twist rotation is a rotational movement when viewed along said downward direction.

18. A three-dimension printing apparatus using photocurable resin, the apparatus comprising:
   an accommodating unit configured to receive light being emitted from a light source, and to provide space for the photocurable resin accommodated in the accommodating unit to be cured by the light;
   a moving unit configured to move cured photocurable resin in a direction away from the light source, so that the photocurable resin accommodated in the accommodating unit is cured sequentially by the light; and
   a separation guiding unit mounted onto the accommodating unit, and configured to move simultaneously together with the accommodating unit along a spiral direction so that the cured photocurable resin is separated from an inner surface of the accommodating unit,
   wherein the separation guiding unit comprises:
   a body configured to cover an outer surface of the accommodating unit;
   a driving unit having a rotation axis whose outer surface has a protruding unit, the driving unit being connected to one end of the body to move the one end of the body in a gravitational direction by the rotation of the protruding unit; and
   a pair of sliding units mounted onto another end of the body and configured such that one sliding unit of the pair of sliding units is fixed while the other sliding unit of the pair of sliding units slides on the body during the operation of the driving unit.

\* \* \* \* \*